United States Patent [19]
Yoneyama

[11] Patent Number: 5,223,979
[45] Date of Patent: Jun. 29, 1993

[54] ZOOM LENS SYSTEM

[75] Inventor: Shuji Yoneyama, Tokyo, Japan

[73] Assignee: Asahi Kogaku Kogyo K.K., Tokyo, Japan

[21] Appl. No.: 774,893

[22] Filed: Oct. 11, 1991

[30] Foreign Application Priority Data

Oct. 12, 1990 [JP] Japan .................... 2-274779

[51] Int. Cl.$^5$ .............................. G02B 15/14
[52] U.S. Cl. .................... 359/676; 359/686; 359/688
[58] Field of Search ......... 359/686–690, 359/676–677, 359/680–688

[56] References Cited

U.S. PATENT DOCUMENTS

| | | |
|---|---|---|
| 4,113,356 | 9/1978 | Matsuhara . |
| 4,490,017 | 12/1984 | Okudaira et al. ............ 359/688 |
| 4,572,620 | 2/1986 | Kikuchi . |
| 4,591,244 | 5/1986 | Aono et al. ................. 359/688 |
| 4,626,076 | 12/1986 | Oshima et al. .............. 359/688 |
| 4,629,293 | 12/1986 | Mihara . |
| 4,659,187 | 4/1987 | Tsuji et al. . |
| 4,699,474 | 10/1987 | Ozawa . |
| 4,701,084 | 10/1987 | Mihara ...................... 359/688 |
| 4,765,722 | 8/1988 | Aomo . |

FOREIGN PATENT DOCUMENTS

| | | |
|---|---|---|
| 54-17042 | 2/1979 | Japan . |
| 54-24652 | 2/1979 | Japan . |
| 63-157118 | 6/1988 | Japan . |
| 63-157119 | 6/1988 | Japan . |
| 63-179310 | 7/1988 | Japan . |
| 2-294608 | 12/1990 | Japan . |
| 1109912 | 4/1968 | United Kingdom . |
| 1109913 | 4/1968 | United Kingdom . |
| 1432072 | 4/1976 | United Kingdom . |
| 1447586 | 8/1976 | United Kingdom . |
| 1469291 | 4/1977 | United Kingdom . |
| 2021799 | 12/1979 | United Kingdom . |
| 2093212 | 8/1982 | United Kingdom . |

*Primary Examiner*—Bruce Y. Arnold
*Assistant Examiner*—Thong Nguyen
*Attorney, Agent, or Firm*—Sughrue, Mion, Zinn, Macpeak & Seas

[57] ABSTRACT

A four-group zoom lens system that achieves satisfactory brightness and zoom ratio for practical applications and yet is compact and can be manufactured at low cost. The lens system includes in order from the object to the image side, a positive first lens group, a negative second lens group, a negative third lens group, and a positive fourth lens group composed of a positive front lens unit ($4_f$) and a positive rear lens unit ($4_r$), the first to third lens groups being capable of moving independently of one another along the optical axis. The front lens unit ($4_f$) includes in order from the object to the image side, a positive first lens element ($4_1$) having a convex surface on the image side, a positive second lens element ($4_2$), a positive third lens element ($4_1$) having a convex surface on the object side and a negative fourth lens element ($4_4$) having a concave surface on the object side. The rear lens unit ($4_r$) includes at least two lens elements which are a positive fifth lens element ($4_5$) having a convex surface on the object side and a negative meniscus sixth lens element ($4_6$) having a concave surface on the image side and which are arranged in order from the image to the object side.

4 Claims, 6 Drawing Sheets

ZOOM LENS SYSTEM

BACKGROUND OF THE INVENTION

1. Field of the Invention

The present invention relates to a zoom lens system, and more particularly to a zoom lens system that is suitable for use with cameras such as a hand-held video camera.

2. Background

As hand-held video cameras have recently gained increasing popularity, a demand has arisen for a suitable zoom lens that is bright, that permits a high zoom ratio, that is compact and that can be manufactured at low cost.

For practical purposes, zoom lenses suitable for use with hand-held video cameras are required to have a brightness on the order of 1.2–1.4 in terms of F number and a zoom ratio of about 10. Zoom lens systems of a four group type including a positive, a negative, a negative and a positive lens group have been proposed as systems that are capable of satisfying the above requirements (see Unexamined Published Japanese Patent Application Nos. 17042/1979, 24652/1979, 157118/1988 and 157119/1988). However, the zoom lens systems described in Unexamined Published Japanese Patent Application Nos. 17042/1979 and 24652/1979 comprise an excess amount of lens elements resulting in an inevitably high production cost. In addition, the geometry of such a system is not compact. The basic concept of the zoom lens system described in Unexamined Published Japanese Patent Application Nos. 157118/1988 and 157119/1988 is to achieve compactness and a high zoom ratio by using new types of optical devices that are capable of changing their radius of curvature. However, it would be difficult to fabricate such a new class of optical devices and the cost of manufacturing a zoom lens system utilizing such optical devices would increase.

SUMMARY OF THE INVENTION

The present invention has been accomplished under these circumstances and has as an object of providing a four-group zoom lens system that achieves satisfactory brightness and zoom ratio for practical applications and yet is compact and can be manufactured at low cost.

The object of the present invention can be attained by a zoom lens system comprising, in order from the object to the image side, a positive first lens group, a negative second lens group, a negative third lens group, and a positive fourth lens group composed of a positive front lens unit $4_f$ and a positive rear lens unit $4_r$, the first to third lens groups being capable of moving independently of one another along the optical axis. The front lens unit $4_f$ comprises in order from the object to the image side, a positive first lens element $4_1$ having a convex surface on the image side, a positive second lens element $4_2$, a positive third lens element $4_3$ having a convex surface on the object side and a negative fourth lens element $4_4$ having a concave surface on the object side. The rear lens unit $4_r$ comprises at least two lens elements which are a positive fifth lens element $4_5$ having a convex surface on the object side and a negative meniscus sixth lens element $4_6$ having a concave surface on the image side and which are arranged in order from the image to the object side.

The zoom lens system may satisfy the following conditions:

$$0.2 < f_w/f_4 < 0.5 \ldots \quad (1)$$

$$0.1 < f_w/f_f < 0.6 \ldots \quad (2)$$

$$-0.5 < (\phi_n + \phi_p)\cdot f_w < -0.2 \ldots \quad (3)$$

where $f_w$: the focal length of the overall system at the wide-angle end;

$f_4$: the focal length of the fourth lens group;

$f_f$: the focal length of the front lens unit $4_f$;

$\phi_n$: the refractive power of the surface of the lens element $4_6$ on the image side; and $\phi_p$: the refractive power of the surface of the element $4_5$ on the object side.

DETAILED DESCRIPTION OF THE PREFERRED EMBODIMENT

Examples

Three examples of the zoom lens system of the present invention are described below with reference to the accompanying drawings. The zoom lens system of each example comprises, in order from the object to the image side, a positive first lens group, a negative second lens group, a negative third lens group, and a positive fourth lens group composed of a positive front lens unit $4_f$ and a positive rear lens unit $4_r$, the first to third lens groups being capable of moving independently of one another along the optical axis. The front lens unit $4_f$ includes in order from the object to the image side, a positive first lens element $4_1$ having a convex surface on the image side, a positive second lens element $4_2$, a positive third lens element $4_3$ having a convex surface on the object side and a negative fourth lens element $4_4$ having a concave surface on the object side. The rear lens unit $4_r$ includes at least two lens elements which are a positive fifth lens element $4_5$ having a convex surface on the object side and a negative meniscus sixth lens element $4_6$ having a concave surface on the image side and which are arranged in order from the image to the object side. The zoom lens system satisfies the following conditions:

$$0.2 < f_w/f_4 < 0.5 \ldots \quad (1)$$

$$0.1 < f_w/f_f < 0.6 \ldots \quad (2)$$

$$-0.5 < (\phi_n + \phi_p)\cdot f_w - 0.2 \ldots \quad (3)$$

where $f_w$: the focal length of the overall system at the wide-angle end;

$f_4$: the focal length of the fourth lens group;

$f_f$: the focal length of the front lens unit $4_f$;

$\phi_n$: the refractive power of the surface of the lens element $4_6$ on the image side; and $\phi_p$: the refractive power of the surface of the lens element $4_5$ on the object side.

In the four-group composition described above, the powers of the individual lens groups are combined in an appropriate manner and the fourth group is composed of a comparatively small number of lens elements. Because of these features, the zoom lens system of the present invention achieves a high zoom ratio and yet it is compact in geometry.

Condition (1) relates to the power of the fourth lens group. If the power of the fourth lens group is so weak that the lower limit of this condition is not reached, the overall length of that lens group must accordingly be increased. In addition, if one wants to maintain a given aperture ratio, the lens diameter must also be increased and the purpose of making a compact lens system cannot be achieved. If the power of the fourth lens group is so strong that the upper limit of condition (1) is exceeded, the geometry of the overall lens system can be made compact but, on the other hand, greater aberrations will occur in the fourth lens group which cannot be compensated for effectively with a small number of lens elements.

Condition (2) relates to the power of the lens unit $4_f$. If the power of this front lens unit is so weak that the lower limit of condition (2) is not reached, the aberrational burden on that lens unit can be reduced but, on the other hand, the aberrational burden on the rear lens unit $4_r$ will increase and more lens elements must be used in that rear lens unit to achieve effective compensation for aberrations. In addition, the lens diameter of the lens unit $4_r$ must be increased, which makes it impossible to meet the requirements of a compact geometry and lower cost. If the power of the lens unit $4_f$ is so strong that the upper limit of condition (2) is exceeded, greater aberrations will occur in the front lens unit which cannot be compensated for effectively.

Condition (3) relates to the negative sum of the powers of the opposing faces of a negative lens element and a positive lens element that are on the image side of the lens unit $4_r$ and that are spaced apart by an aerial gap. This condition is necessary for effective compensation for coma and astigmatism. If the negative sum of powers is so strong that the lower limit of condition (3) is not reached, overcompensation for coma and astigmatism will occur. If the negative sum of powers is so weak that the upper limit of condition (3) is exceeded, coma and astigmatism will be undercompensated for.

Astigmatism and distortion are sensitive to those lens surfaces which are intercepted by principal rays at large heights. Therefore, placing the negative meniscus lens element $4_6$ and the positive lens element $4_5$ within the lens unit $4_r$ so that they are positioned the closest to the image of all the lens elements used in the system is favorable for the purpose of attaining a balance between astigmatism and distortion.

In a preferred embodiment, the zoom lens system of the present invention satisfies the following two additional conditions:

$$-0.35 < f_w/f_n < -0.1 \ldots \quad (4)$$

$$1.2 < d_4/f_w < 3.0 \ldots \quad (5)$$

where $f_w$: the focal length of the overall system at the wide-angle end;

$f_f$: the focal length of the front lens unit $4_f$;

$f_n$: the focal length of the negative lens element $4_4$; and $d_4$: the distance between the surface of the lens unit $4_f$ that is the closest to the object and the apex of the concave surface of the negative lens element $4_4$ which is on the object side.

Condition (4) relates to the power of the negative lens element in the lens unit $4_f$. If the power of the negative lens in the lens unit $4_f$ is so weak that the lower limit of condition (4) is not reached, the rays of light diverging from the second and third lens groups must be converged by strong refraction with the other three lens elements in the lens unit $4_f$. However, it becomes difficult to achieve effective compensation for the resulting spherical aberration. If the power of the negative lens element in the lens unit $4_f$ is so strong that the upper limit of condition (4) is exceeded, higher-order aberrations will develop in increased amounts.

Condition (5) specifies the distance between the surface of the lens unit $4_f$ that is the closest to the object and the apex of the concave surface of the negative lens element in the same lens unit $4_f$ which is on the object side. This condition is critical to making the geometry of lenses compact and achieving effective compensation for aberrations, especially spherical aberration. If the distance of interest is so great that the upper limit of condition (5) is exceeded, the overall length of the lens system will unduly increase. In addition, if the spread of divergent on-axis rays increases, the lens diameter will increase and, at the same time, substantial spherical aberration will occur due to an increase in the height of the ray intercept. If, on the other hand, the spread of convergent on-axis rays increases, the height at which the concave surface of the negative lens element on the object side is intercepted by incident rays will decrease, leading to insufficient compensation for spherical aberration. If the distance of interest is so small that the lower limit of condition (5) is not reached, it becomes impossible to shape the circumferential edges of positive lenses properly while maintaining the lens diameter determined by a desired F number, thereby causing considerable difficulty in lens fabrication.

In still another embodiment of the present invention, the first lens group comprises, in order from the object to the image side, a negative meniscus first lens element $1_1$ having a convex surface on the object side, a positive second lens element $1_2$ and a positive third lens element $1_3$ having a convex surface on the object side. The second lens group comprises, in order from the object to the image side, a negative first lens element $2_1$ having a concave surface on the image side, a negative second lens element $2_2$ having a concave surface on both sides and a positive third lens element $2_3$. The third lens group comprises a single negative lens element having a concave surface on the object side. The zoom lens system further satisfies the following conditions:

$$-0.7 < f_w/f_2 < -0.35 \ldots \quad (6)$$

$$4 < L/f_w < 8 \ldots \quad (7)$$

$$0.07 < f_w/f_1 < 0.20 \ldots \quad (8)$$

$$0.07 < (\phi_2 + \phi_3) \cdot f_w < 0.15 \ldots \quad (9)$$

where
- $f_w$: the focal length of the overall system at the wide-angle end;
- $f_1$: the focal length of the first lens group;
- $f_2$: the focal length of the second lens group;
- L: the distance between the second and third lens groups at the wide-angle end;
- $\phi_2$: the refract power of the surface of the lens element $2_2$ on the image side and
- $\phi_3$: the refractive power of the surface of the lens element $2_3$ on the object side.

For increasing the zoom ratio that can be achieved by a four-group zoom lens systems, it is generally required to increase either the amount of movement of the zooming second lens group or the power of that group. Condition (6) relates to the power of the second lens group. If the negative refractive power of the second lens group is so strong that the lower limit of this condition is not reached, the necessary amount of movement of that lens group can be reduced, which is favorable for the purpose of making the overall lens system compact. On the other hand, great aberrations will develop in the second lens group and the aberrational variations that occur during zooming are so extensive that it becomes difficult to maintain satisfactory lens performance. Furthermore, the higher the refractive power, the more closer the tolerance for misalignment and other errors that may occur during lens fabrication and the higher the total production cost. If the negative refractive power of the second lens group is so weak that the upper limit of condition (6) is exceeded, the amount by which the second lens group must be moved for zooming will increase, making it impossible to realize a compact lens system.

Condition (7) specifies the distance between the second and third lens groups at the wide-angle end. This condition must be satisfied in order to insure the necessary amount of movement of the second lens group. If the distance between the second and third lens groups is so small that the lower limit of condition (7) is not reached, a condition will result that is favorable for the purpose of realizing a compact lens system but, on the other hand, it becomes difficult to insure that the second lens group will move by a sufficient amount for achieving desired zooming. To meet this need, the power of the second lens group must be increased. However, increasing the power makes it difficult to satisfy condition (6). If the distance between the second and third lens group is so great that the upper limit of condition (7) is exceeded, the amount of movement of the second lens group can be increased, which is favorable for the purpose of effective compensation for aberrations. On the other hand, the overall lens system will become bulky.

Condition (8) relates to the power of the first lens group. If the power of the first lens group is so small that the lower limit of condition (8) is not reached, the amount of lens advancement necessary to perform shooting at a maximum image magnification will increase so as to reduce the marginal illumination. To avoid this problem, the lens diameter of the first lens group must be increased resulting in a bulky lens. If the power of the first lens group is so strong that the upper limit of condition (8) is exceeded, the F number of the first lens group taken alone at the telephoto end will decrease so as to cause difficulty in achieving effective aberrational compensation. As a result, the spherical aberration that occurs in the overall lens system at the telephoto end will be undercompensated.

Condition (9) relates to the sum of the powers of the opposing faces of lens elements $2_2$ and $2_3$ that are positioned in the second lens group as spaced apart by an aerial gap. This condition is necessary to insure that the spherical aberration and coma that will occur in the second lens group are held at acceptable levels so that the overall lens system will experience minimum aberrational variations during zooming. If the summed power is so strong that the upper limit of condition (9) is exceeded, a condition will result that is favorable to effective compensation for spherical aberration and coma. However, the tolerance for misalignment and other errors that might occur during fabrication will become so small that considerable difficulty is involved in lens manufacture. If the summed power is so weak that the lower limit of condition (9) is not reached, spherical aberration or coma cannot be effectively compensated for and the increased aberrational variations that occur during zooming will make it impossible for the overall lens system to exhibit satisfactory performance over the intended zoom range.

EXAMPLE 1

Figure 1:
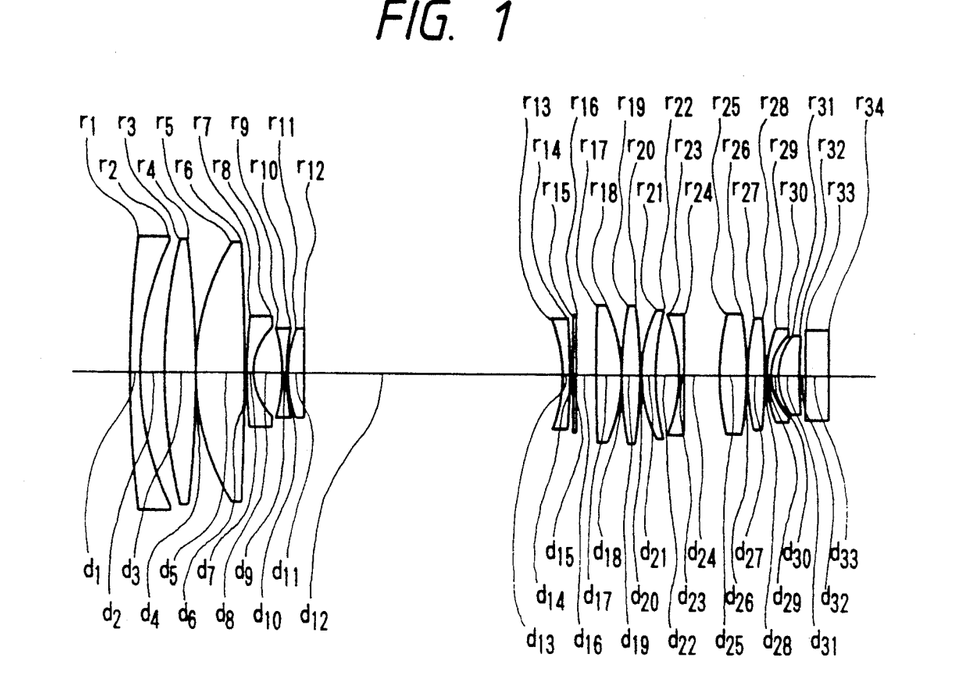
FIGS. 1, 5 and 9 are simplified cross-sectional views of the zoom lens systems constructed according to Examples 1-3, respectively, of the present invention.
Figure 2:
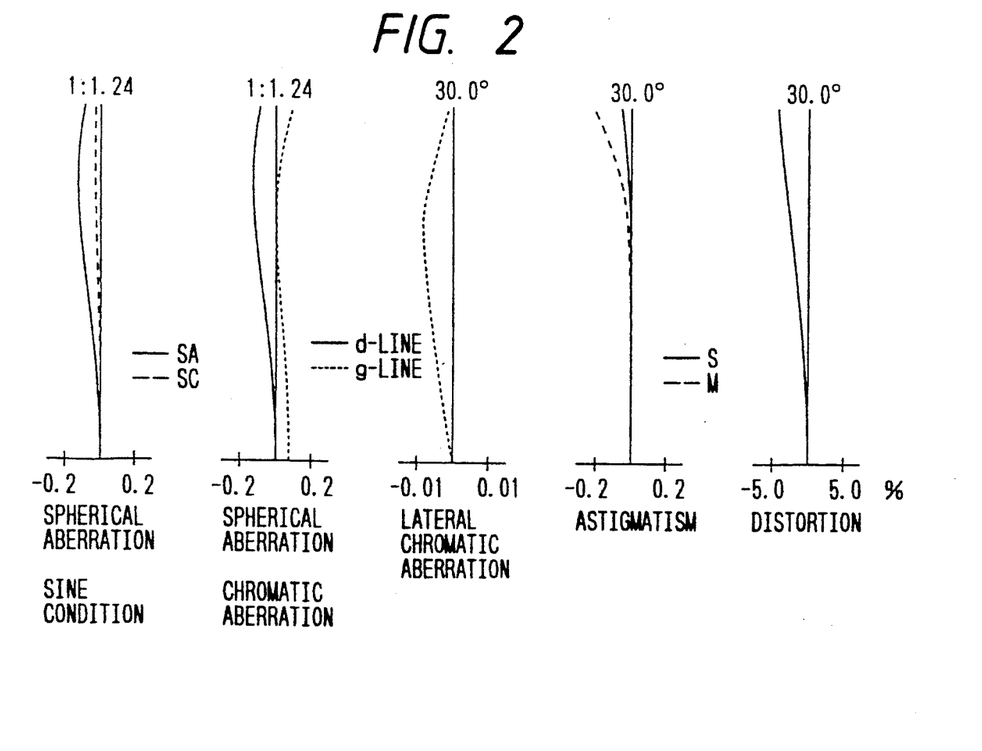
FIGS. 2-4 are graphs plotting the aberration curves obtained with the zoom lens system of example 1 at the wide-angle, middle-angle and telephoto ends, respectively.
Figure 3:
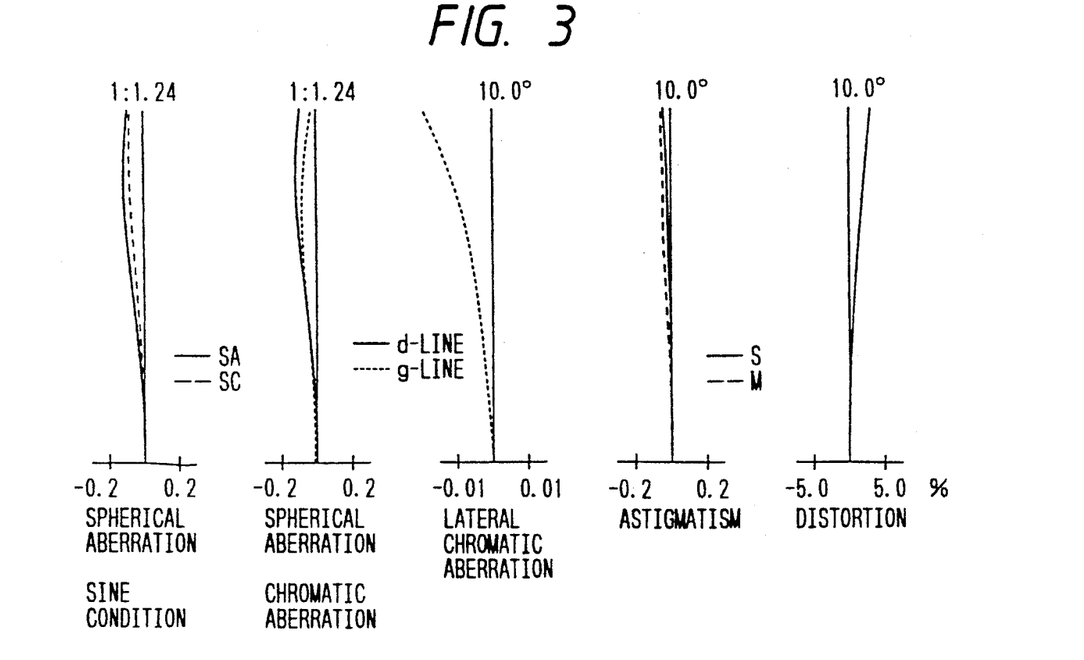
Figure 4:
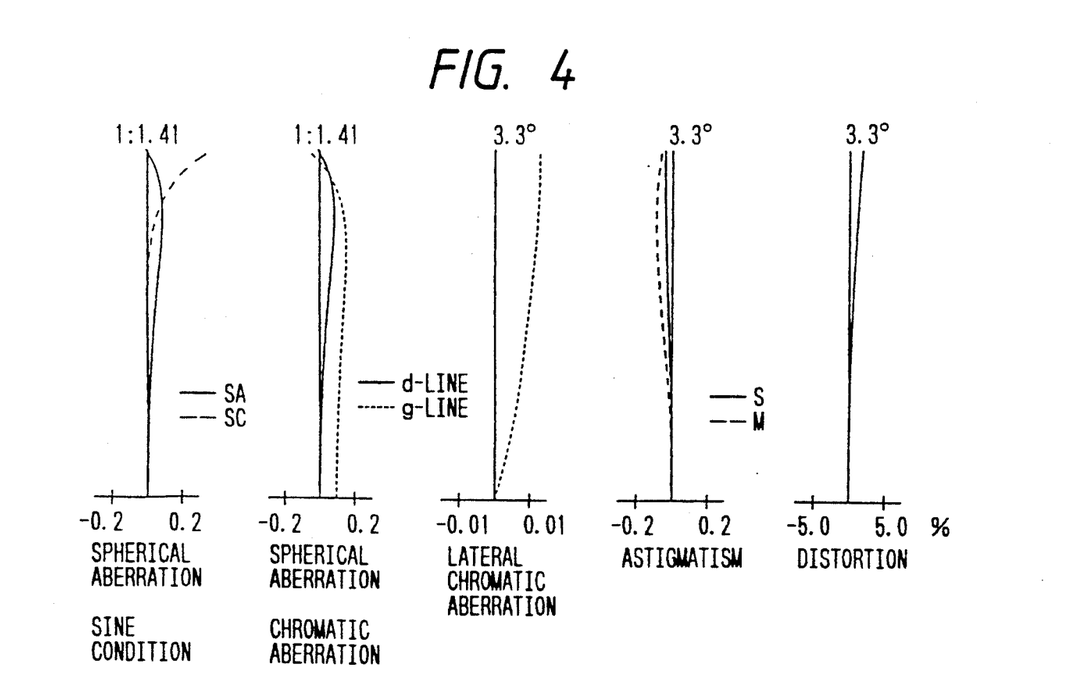

FIG. 1 is a simplified cross-sectional view showing the zoom lens system of Example 1 when it is at the wide-angle end. FIG. 2 is a graph plotting the aberration curves obtained at the wide-angle end of this zoom lens system; FIG. 3 is a graph plotting the aberration curves obtained at the middle-angled end; and FIG. 4 is a graph plotting the aberration curves obtained at the telephoto end.

Specific numerical data for the zoom lens system of Example 1 are provided below in Tables 1 and 2.

In the numerical data provided below for the three examples of the present invention, $F_{NO.}$ denotes the aperture ratio (F number); f, the focal length of the overall system; w, the half-view angle; r, the radius of curvature of an individual lens surface; d, the lens thickness or the aerial distance between adjacent lenses; n, the refractive index of an individual lens at the d-line; and $\nu$, the Abbe number of an individual lens at the d-line. Each of the lens systems of Examples 1-3 includes a filter and a faceplate and compensation for aberrations shall be effected for the entire system including the filter and faceplate.

TABLE 1

| | $F_{No.}$ = 1:1.2-1.4 f = 7.22 − 67.90 mm w = 30.0°-3.3° | | | |
|---|---|---|---|---|
| No | r | d | n | $\nu$ |
| 1 | 228.000 | 2.00 | 1.80518 | 25.4 |
| 2 | 57.855 | 5.47 | — | 55.5 |
| 3 | 124.000 | 5.90 | 1.69680 | 55.5 |
| 4 | −265.000 | 0.10 | — | |
| 5 | 49.497 | 9.47 | 1.69680 | 55.5 |
| 6 | −957.523 | variable | | |
| 7 | 148.000 | 1.20 | 1.77250 | 49.6 |
| 8 | 12.800 | 5.57 | | |
| 9 | −36.2501 | 1.00 | 1.77250 | 49.6 |
| 10 | 51.212 | 0.10 | | |
| 11 | 27.404 | 3.15 | 1.84666 | 23.9 |
| 12 | 2100.000 | variable | | |
| 13 | −27.450 | 1.20 | 1.6980 | 55.5 |
| 14 | −161.880 | variable | | |
| 15 | ∞ | 0.50 | 1.51633 | 64.1 |
| 16 | ∞ | 4.06 | | filter |
| 17 | 412.637 | 4.70 | 1.77250 | 49.6 |
| 18 | −36.621 | 0.10 | — | |
| 19 | 69.064 | 3.64 | 1.69680 | 55.5 |
| 20 | −118.6551 | 0.10 | — | |

TABLE 1-continued $F_{No.} = 1:1.2-1.4$  $f = 7.22 - 67.90$ mm
$w = 30.0°-3.3°$

| No | r | d | n | ν |
|---|---|---|---|---|
| 21 | 27.153 | 2.92 | 1.69680 | 55.5 |
| 22 | 45.212 | 4.62 | — | |
| 23 | −34.933 | 1.20 | 1.84666 | 23.9 |
| 24 | −1517.673 | 7.03 | — | |
| 25 | 53.551 | 5.28 | 1.58144 | 40.8 |
| 26 | −73.752 | 0.10 | — | |
| 27 | 47.484 | 3.47 | 1.60311 | 60.7 |
| 28 | −112.399 | 0.10 | — | |
| 29 | 23.010 | 1.20 | 1.84666 | 23.9 |
| 30 | 11.718 | 1.22 | — | |
| 31 | 13.432 | 4.22 | 1.48749 | 70.2 |
| 32 | 82.239 | 0.61 | — | |
| 33 | ∞ | 4.70 | 1.49782 | 66.8 |
| 34 | ∞ | — | faceplate | |

TABLE 2

| | $f = 7.22$ | $f = 22.00$ | $f = 67.90$ |
|---|---|---|---|
| $d_6$ | 0.8 | 30.9 | 47.0 |
| $d_{12}$ | 51.2 | 16.1 | 3.9 |
| $d_{14}$ | 0.6 | 5.7 | 1.8 |

EXAMPLE 2

Figure 5:
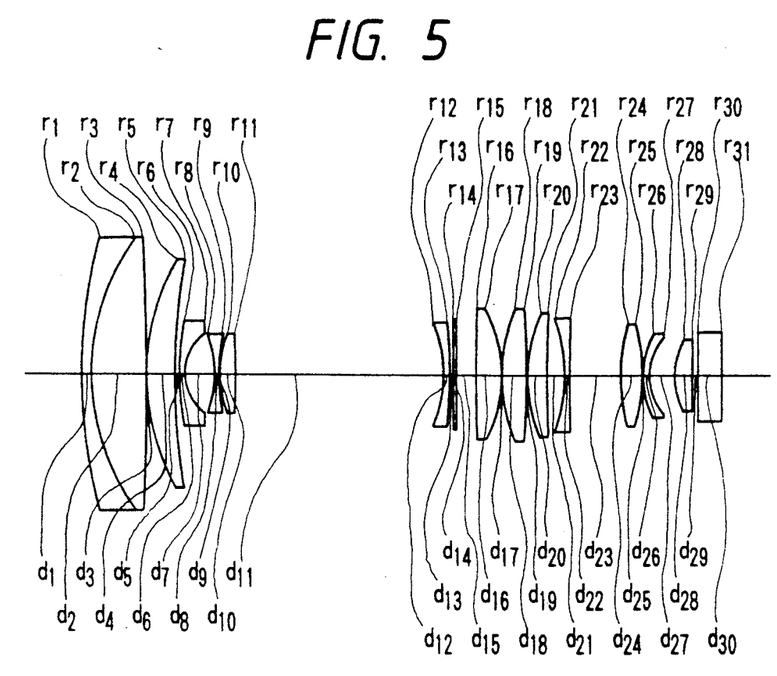
Figure 6:
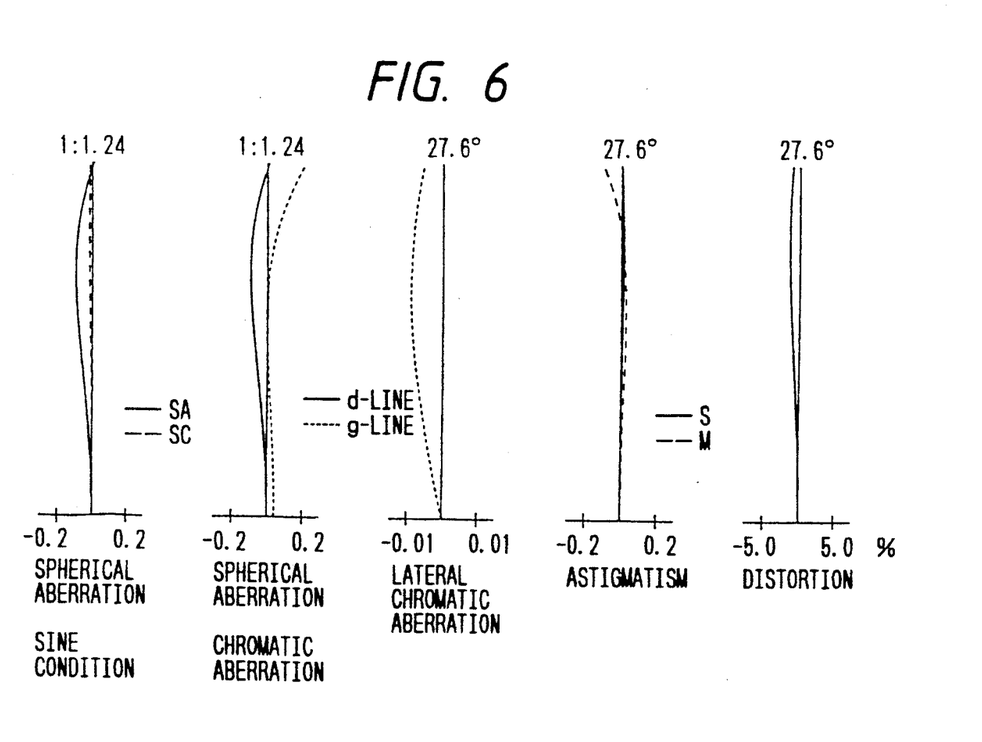
FIGS. 6-8 are graphs plotting the aberration curves obtained with the zoom lens system of Example 2 at the wide-angle, middle-angle and telephoto ends, respectively.
Figure 7:
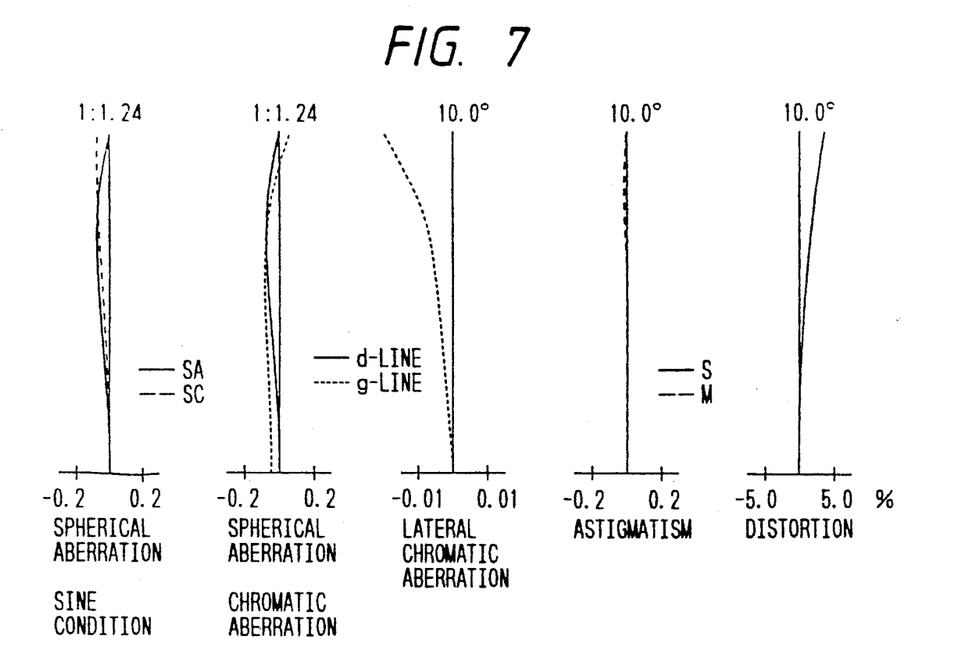
Figure 8:
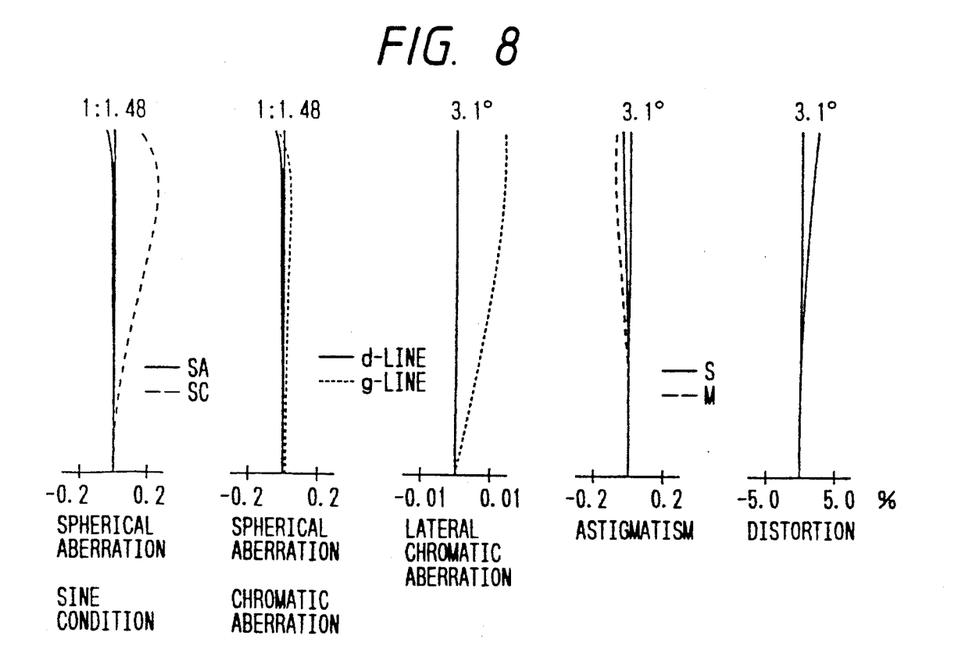

FIG. 5 is a simplified cross-sectional view showing the zoom lens system of Example 2 when it is at the wide-angle end. FIG. 6 is a graph plotting the aberration curves obtained at the wide-angle end of this zoom lens system; FIG. 7 is a graph plotting the aberration curves obtained at the middle-angle end; and FIG. 8 is a graph plotting the aberration curves obtained at the telephoto end.

Specific numerical data for the zoom lens system of Example 2 are provided below in Tables 3 and 4.

TABLE 3

$F_{No.} = 1:1.2-1.5$  $f = 7.72 - 71.98$ mm
$w = 27.6°-3.1°$

| No. | r | d | n | ν |
|---|---|---|---|---|
| 1 | 105.955 | 1.70 | 1.80518 | 25.4 |
| 2 | 44.342 | 10.99 | 1.69680 | 55.5 |
| 3 | −3284.049 | 0.10 | — | |
| 4 | 46.953 | 5.49 | 1.77250 | 49.6 |
| 5 | 126.840 | variable | — | |
| 6 | 55.083 | 1.20 | 1.80400 | 46.6 |
| 7 | 10.379 | 5.70 | — | |
| 8 | −23.512 | 1.00 | 1.77250 | 49.6 |
| 9 | 43.897 | 0.10 | — | |
| 10 | 24.986 | 3.08 | 1.84666 | 23.8 |
| 11 | −190.687 | variable | — | |
| 12 | −27.911 | 1.20 | 1.69680 | 55.5 |
| 13 | −126.183 | variable | — | |
| 14 | ∞ | 0.50 | 1.51633 | 64.1 |
| 15 | ∞ | 4.00 | filter | |
| 16 | 475.696 | 5.00 | 1.69680 | 55.5 |
| 17 | −31.336 | 0.10 | — | |
| 18 | 36.543 | 4.64 | 1.51633 | 64.1 |
| 19 | −275.701 | 0.10 | — | |
| 20 | 31.506 | 4.03 | 1.58913 | 61.2 |
| 21 | 227.099 | 3.34 | — | |
| 22 | 36.229 | 1.20 | 1.84666 | 23.9 |
| 23 | 7990.647 | 9.80 | — | |
| 24 | 39.196 | 4.27 | 1.56883 | 56.3 |
| 25 | −45.831 | 0.10 | — | |
| 26 | 17.342 | 1.20 | 1.84666 | 23.9 |
| 27 | 11.399 | 4.93 | — | |
| 28 | 16.022 | 3.55 | 1.48749 | 70.2 |
| 29 | −2111.776 | 1.00 | — | |
| 30 | ∞ | 4.70 | 1.49782 | 66.8 |
| 31 | ∞ | — | faceplate | |

TABLE 4

| | $f = 7.72$ | $f = 22.00$ | $f = 71.98$ |
|---|---|---|---|
| $d_5$ | 0.9 | 24.1 | 37.7 |
| $d_{11}$ | 41.5 | 12.5 | 3.8 |
| $d_{13}$ | 0.6 | 6.3 | 1.5 |

EXAMPLE 3

Figure 9:
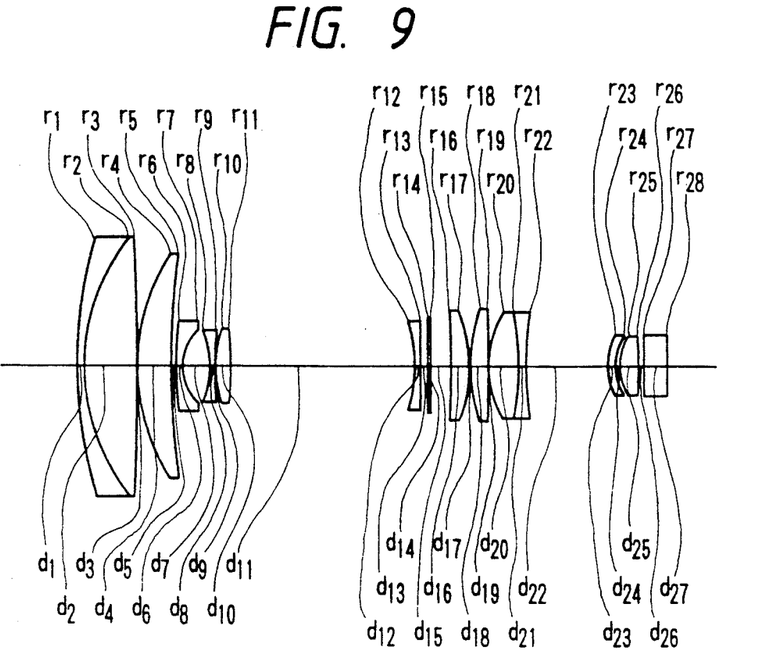
Figure 10:
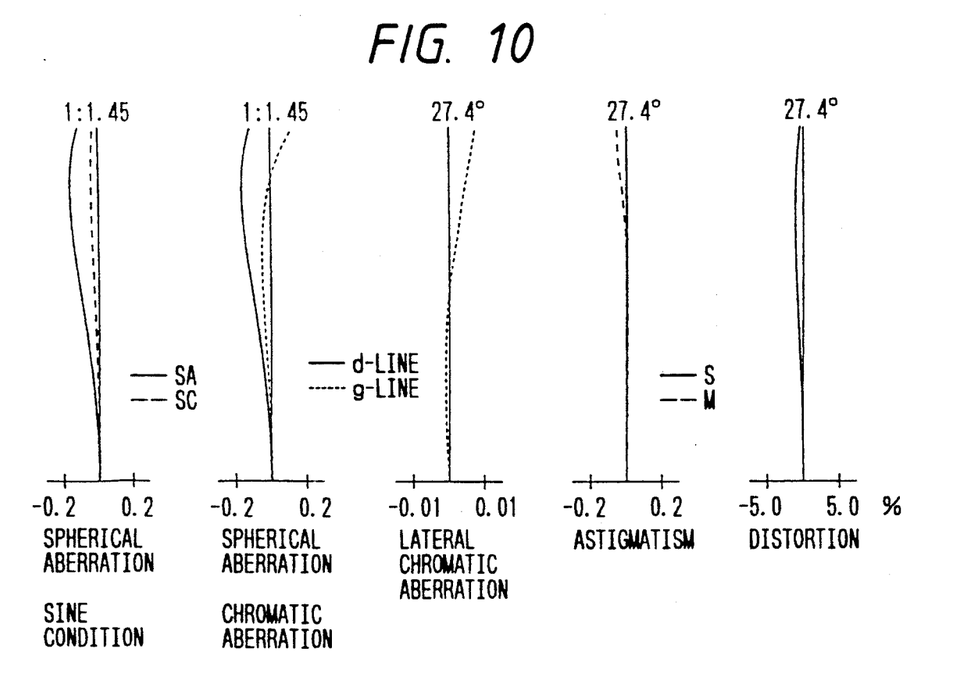
FIGS. 10-12 are graphs plotting the aberration curves obtained with the zoom lens system of Example 3 at the wide-angle, middle-angle and telephoto ends, respectively.
Figure 11:
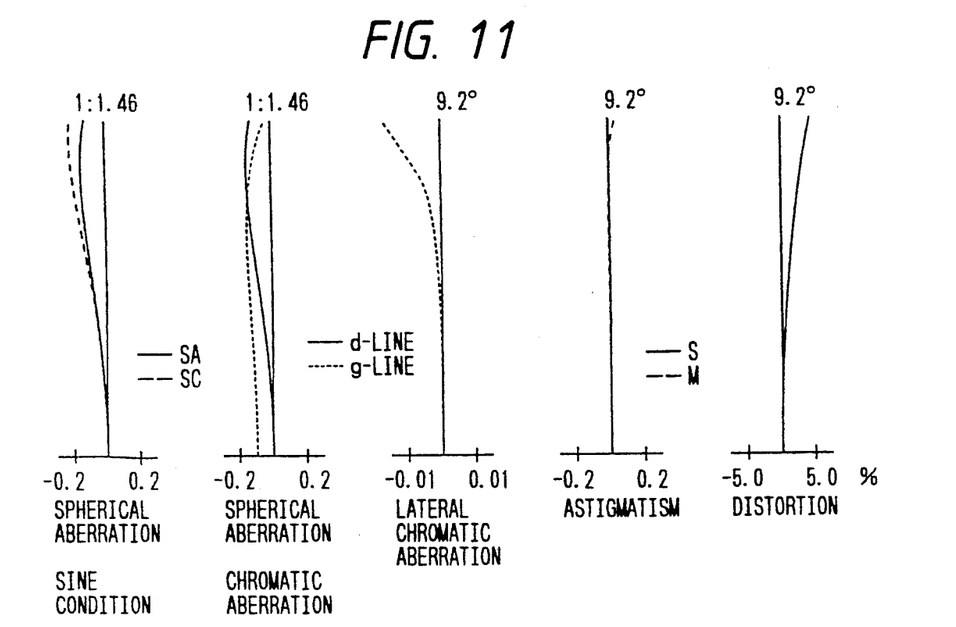
Figure 12:
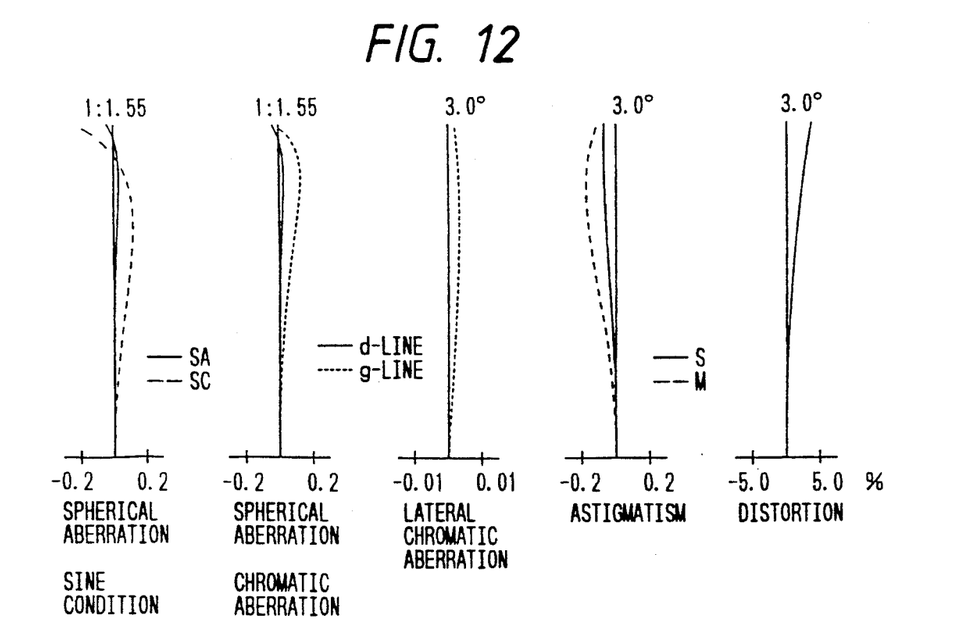

FIG. 9 is a simplified cross-sectional view showing the zoom len system of Example 3 when it is at the wide-angle end. FIG. 10 is a graph plotting the aberration curves obtained at the wide-angle end; FIG. 11 is a graph plotting the aberration curves obtained at the middle-angle end; and FIG. 12 is a graph plotting the aberration curves obtained at the telephoto end. Specific numerical data for the zoom lens system of Example 3 are provided below in Tables 5 and 6.

TABLE 5

$F_{No.} = 1:1.4-1.5$  $f = 7.76 - 72.40$ mm
$w = 27.4°- 3.0°$

| No. | r | d | n | ν |
|---|---|---|---|---|
| 1 | 89.137 | 1.70 | 1.80518 | 25.4 |
| 2 | 41.405 | 10.32 | 1.60311 | 60.7 |
| 3 | −661.316 | 0.10 | — | |
| 4 | 41.605 | 6.58 | 1.71300 | 53.8 |
| 5 | 141.945 | variable | — | |
| 6 | 81.378 | 1.20 | 1.80400 | 46.6 |
| 7 | 9.936 | 4.95 | — | |
| 8 | −21.190 | 1.10 | 1.77250 | 49.6 |
| 9 | 34.501 | 0.10 | — | |
| 10 | 23.500 | 3.17 | 1.84666 | 23.9 |
| 11 | −71.594 | variable | — | |
| 12 | −28.274 | 1.20 | 1.69680 | 55.5 |
| 13 | −284.279 | variable | — | |
| 14 | ∞ | 0.50 | 1.51633 | 64.1 |
| 15 | ∞ | 4.10 | filter | |
| 16 | −235.189 | 3.84 | 1.69680 | 55.5 |
| 17 | −26.688 | 0.10 | — | |
| 18 | 36.983 | 3.41 | 1.62280 | 57.1 |
| 19 | −1191.700 | 0.10 | — | |
| 20 | 20.267 | 5.80 | 1.51633 | 64.1 |
| 21 | −51.145 | 1.50 | 1.84666 | 23.9 |
| 22 | 73.836 | 16.09 | — | |
| 23 | 12.523 | 1.20 | 1.84666 | 23.9 |
| 24 | 8.831 | 1.19 | — | |
| 25 | 12.284 | 3.65 | 1.48749 | 70.2 |
| 26 | −65.951 | 1.00 | — | |
| 27 | ∞ | 4.70 | 1.49782 | 66.8 |
| 28 | ∞ | — | faceplate | |

TABLE 6

| | $f = 7.76$ | $f = 23.7$ | $f = 72.4$ |
|---|---|---|---|
| $d_5$ | 1.2 | 23.1 | 34.3 |
| $d_{11}$ | 36.1 | 9.5 | 3.7 |
| $d_{13}$ | 1.3 | 6.0 | 0.7 |

SPECIFICATIONS OF EXAMPLES 1-3

Table 7 shows the specifications of the zoom lens systems of Examples 1-3 as they relate to conditions (1)–(9).

TABLE 7

| Example | 1 | 2 | 3 |
|---|---|---|---|
| $f_w/f_4$ | 0.31 | 0.29 | 0.35 |
| $f_w/f_f$ | 0.26 | 0.31 | 0.41 |
| $(\phi_n + \phi_p) \cdot f_w$ | −0.26 | −0.34 | −0.44 |
| $f_w/f_n$ | −0.17 | −0.18 | −0.22 |
| $d_4/f_w$ | 2.23 | 2.23 | 1.71 |
| $f_w/f_2$ | −0.445 | 0.588 | −0.626 |
| $L/f_w$ | 7.092 | 5.375 | 4.652 |
| $f_w/f_1$ | 0.102 | 0.121 | 0.133 |

TABLE 7-continued

| Example | 1 | 2 | 3 |
| --- | --- | --- | --- |
| $(\phi_2 + \phi_3) \cdot f_w$ | 0.114 | 0.126 | 0.106 |

According to Examples 1–3, zoom lens systems are obtained that have a brightness of about 1.2–1.4 in terms of F number and a zoom ratio of up to about 10. These values are satisfactory for practical purposes.

The present invention provides a zoom lens system of a four-group composition that is bright, has a high zoom ratio, is compact and can be manufactured at low cost.

What is claimed is:

1. A zoom lens system comprising, in order from the object to the image side, a positive first lens group, a negative second lens group, a negative third lens group, and a positive fourth lens group composed of a positive front lens unit ($4_f$) and a positive rear lens unit ($4_r$), said first to third lens groups being capable of moving independently of one another along an optical axis, said front lens unit ($4_f$) comprising in order from the object to the image side, a positive first lens element ($4_1$) having a convex surface on the image side, a positive second lens element ($4_2$), a positive third lens element having a convex surface on the object side and a negative fourth lens element ($4_4$) having a concave surface on the object side, said rear lens unit ($4_r$) comprising at least two lens elements which are a positive fifth lens element ($4_5$) having a convex surface on the object side and a negative meniscus sixth lens element ($4_6$) having a concave surface on the image side and which are arranged in order from the image to the object side, wherein said zoom lens system satisfies the following conditions:

$$0.2 < f_w/f_4 < 0.5 \ldots \quad (1)$$

$$0.2 < f_w/f_f < 0.6 \ldots \quad (2)$$

$$-0.5 < (\phi_n + \phi_p) \cdot f_w < -0.2 \ldots \quad (3)$$

where
 $f_w$: the focal length of the overall system at the wide-angle end;
 $f_4$: the focal length of the fourth lens group;
 $f_f$: the focal length of the front lens unit $4_f$;
 $\phi_n$: the refractive power of the surface of the lens element $4_6$ on the image side; and
 $\phi_p$: the refractive power of the surface of the lens element $4_5$ on the object side.

2. A zoom lens system according to claim 1 which further satisfies the following conditions:

$$-0.35 < f_w/f_n < 0.1 \ldots \quad (4)$$

$$1.2 < d_4/f_w < 3.0 \ldots \quad (5)$$

where
 $f_w$: the focal length of the overall system at the wide-angle end;
 $f_f$: the focal length of the front lens unit $4_f$;
 $f_n$: the focal length of the negative fourth lens element $4_4$; and
 $d_4$: the distance between the surface of the lens unit $4_f$ that is the closest to the object and the apex of the concave surface of the negative lens element $4_4$ which is on the object side.

3. A zoom lens system according to claim 1 wherein the first lens group comprises, in order from the object to the image side, a negative meniscus first lens element ($1_1$) having a convex surface on the object side, a positive second lens element ($1_2$) and a positive third lens element ($1_3$) having a convex surface on the object side, the second lens group comprising, in order from the object to the image side, a negative first lens element ($2_1$), having a concave surface on the image side, a negative second lens element ($2_2$) having a concave surface on both sides and a positive third lens element ($2_3$), and the third lens group comprising a single negative lens element having a concave surface on the object side, which zoom lens system further satisfies the following conditions:

$$-0.7 < f_w/f_2 < -0.35 \ldots \quad (6)$$

$$4 < L/f_w < 8 \ldots \quad (7)$$

$$0.07 < f_w/f_1 < 0.20 \ldots \quad (8)$$

$$0.07 < (\phi_2 + \phi_3) \cdot f_w < 0.15 \ldots \quad (9)$$

where
 $f_w$: the focal length of the overall system at the wide-angle end;
 $f_1$: the focal length of the first lens group;
 $f_2$: the focal length of the second lens group;
 L: the distance between the second and third lens groups at the wide-angle end;
 $\phi_2$: the refractive power of the surface of the lens element $2_2$ on the image side; and
 $\phi_3$: the refractive power of the surface of the lens element $2_3$ on the object side.

4. A zoom lens system comprising, in order from the object to the image side, a positive first lens group, a negative second lens group, a negative third lens group, and a positive fourth lens group composed of a positive front lens unit ($4_f$) and a positive rear lens unit ($4_r$), said first to third lens groups being capable of moving independently of one another along an optical axis, said front lens unit ($4_f$) comprising in order from the object to the image side, a positive first lens element ($4_1$) having a convex surface on the image side, a positive second lens element ($4_2$), a positive third lens element having a convex surface on the object side and a negative fourth lens element ($4_4$) having a concave surface on the object side, said rear lens unit ($4_r$) comprising at least two lens elements which are a positive fifth lens element ($4_5$) having a convex surface on the object side and a negative meniscus sixth lens element ($4_6$) having a concave surface on the image side and which are arranged in order from the image to the object side, wherein said zoom lens system satisfies the following conditions:

$$0.2 < f_w/f_4 0.5 \ldots \quad (1)$$

where
 $f_w$: the focal length of the overall system at the wide-angle end; and
 $f_4$: the focal length of the fourth lens group.

* * * * *